United States Patent
Dhanakshirur et al.

(10) Patent No.: US 8,549,585 B2
(45) Date of Patent: Oct. 1, 2013

(54) METHOD AND APPARATUS TO IMPLEMENT SECURED, LAYERED LOGOUT FROM A COMPUTER SYSTEM

(75) Inventors: Girish Dhanakshirur, Delray Beach, FL (US); Jason Garrabrant, Somerville, MA (US); Andrew Otte, Boston, MA (US); Melissa Schoonmaker, Tewksbury, MA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/815,177

(22) Filed: Jun. 14, 2010

(65) Prior Publication Data
US 2011/0307941 A1 Dec. 15, 2011

(51) Int. Cl.
*H04L 29/06* (2006.01)

(52) U.S. Cl.
USPC .............. 726/4; 726/1; 726/2; 726/3; 726/17; 713/163; 713/164; 713/165; 713/166; 380/277; 380/278; 380/28

(58) Field of Classification Search
USPC .......................................................... 726/4
See application file for complete search history.

(56) References Cited

U.S. PATENT DOCUMENTS

| | | | | |
|---|---|---|---|---|
| 5,276,735 | A * | 1/1994 | Boebert et al. | 713/167 |
| 7,380,121 | B2 * | 5/2008 | Nomura et al. | 713/166 |
| 7,441,265 | B2 * | 10/2008 | Staamann et al. | 726/4 |
| 8,065,713 | B1 * | 11/2011 | Vainstein et al. | 726/2 |
| 8,185,948 | B2 * | 5/2012 | Uruta et al. | 726/17 |
| 2002/0133702 | A1 * | 9/2002 | Stevens | 713/163 |
| 2003/0184474 | A1 * | 10/2003 | Bajikar | 342/450 |
| 2004/0103202 | A1 * | 5/2004 | Hildebrand et al. | 709/229 |
| 2007/0172053 | A1 * | 7/2007 | Poirier | 380/28 |
| 2008/0159541 | A1 * | 7/2008 | Kumar et al. | 380/278 |
| 2008/0165971 | A1 * | 7/2008 | de Cesare et al. | 380/277 |
| 2010/0042824 | A1 * | 2/2010 | Lee et al. | 713/2 |
| 2011/0154434 | A1 * | 6/2011 | Hernacki | 726/1 |

OTHER PUBLICATIONS http://palms.princeton.edu/system/files/levin_trustO9.pdf, Apr. 1, 2009.*
Hung et al, "Towards End-to-End Privacy Control in the Outsourcing of Market Activities: a Web Services Integration," ICEC'05, Aug. 15-17, 2005.
Irvine et al, "A Security Architecture for Transient Trust," CSAW'08, ACM, Oct. 31, 2008.

* cited by examiner

*Primary Examiner* — Kambiz Zand
*Assistant Examiner* — Yonas Bayou
(74) *Attorney, Agent, or Firm* — Jeffrey S. LaBaw; David H. Judson

(57) ABSTRACT

A secure, layered logout of a user session is implemented in a web-based management tool, such as a middleware appliance. A logout strategy is provided to include a set of security levels of varying sensitivity, with each security level having a set of permissions associated therewith and that are enforced upon a timeout. Preferably, each succeeding security level in the set of security levels is reached as time increases from an idle time associated with the user session. Upon expiration of a timeout associated with a security level, the set of permissions associated with the security level are then enforced against at least one managed object while the user session continues. As each next security level is reached, the set of permissions associated with the security level are then enforced (with respect to the managed object or against one or more other managed objects), once again while the user session continues. Each of the objects preferably is managed independently of at least one other object; thus, the layered logout may enforce different permissions with respect to different managed objects while at the time maintaining the user session. If the user takes no action, eventually a timeout associated with a final security level of the set of security levels will occur, at which point the user session is finally terminated.

26 Claims, 4 Drawing Sheets

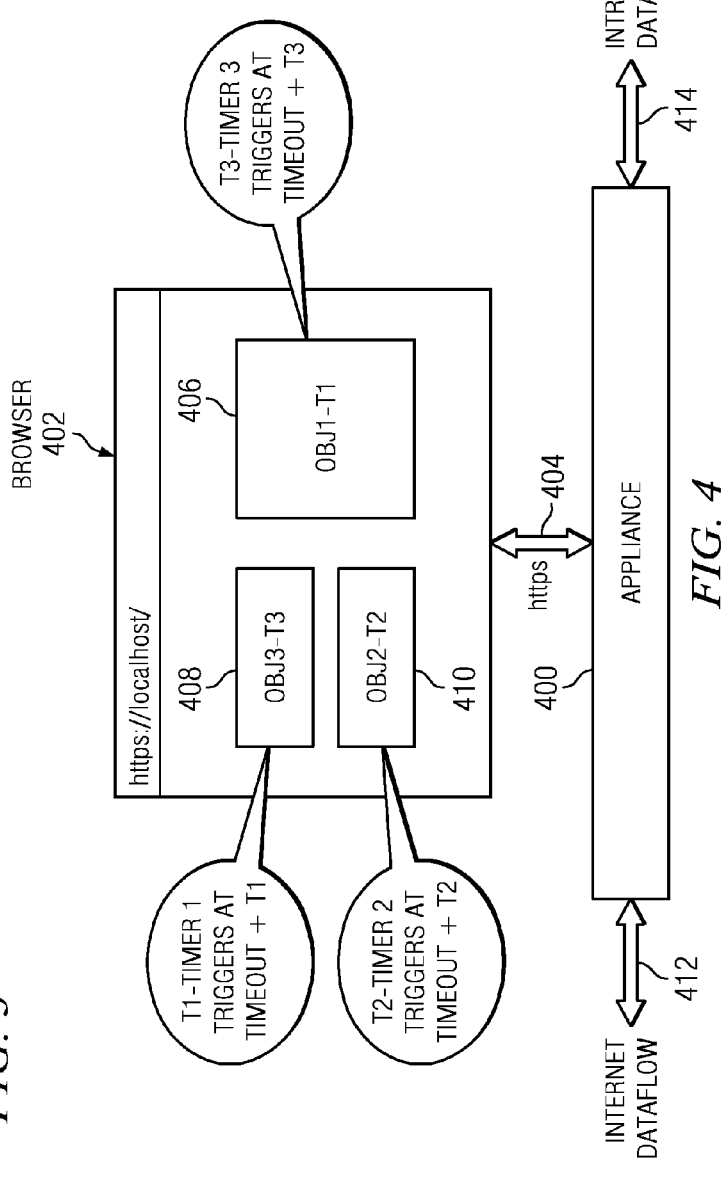

METHOD AND APPARATUS TO IMPLEMENT SECURED, LAYERED LOGOUT FROM A COMPUTER SYSTEM

BACKGROUND OF THE INVENTION

1. Technical Field

This disclosure relates generally to web application security and in particular to a method and system for secure logout from a machine, such as a web application management device.

2. Background of the Related Art

Service-Oriented Architectures enable the creation of composite applications that are comprised of reusable, loosely-coupled service components. Using the Simple Object Access Protocol (SOAP), Service Oriented Architecture (SOA) clients can invoke web services built atop the eXtensble Markup Language (XML) without explicit support for a wide variety of transport protocols and formats. A SOAP facade that sits in front of a legacy service may be constructed to enable web service virtualization, where clients invoke a virtualized version of the underlying service, thereby mitigating the need to understand intricate details of the service's implementation.

Appliances built purposely for performing traditional middleware service oriented architecture (SOA) functions are becoming more prevalent in certain computer environments. For example, SOA middleware appliances may simplify, help secure or accelerate XML and Web services deployments while extending an existing SOA infrastructure across an enterprise. The move toward middleware appliances that are built purposefully for SOA functions is predicated, at least in part, by the observation that conventional software solutions have increased processing requirements of SOA-based payloads despite the broad functional platforms, flexibility and customization available in conventional software solutions.

The utilization of middleware-purposed hardware and lightweight middleware stacks can address the performance burden experienced by conventional software solutions. In addition, the appliance form-factor provides a secure, consumable packaging for implementing middleware SOA functions. However, the gains achieved by conventional middleware appliances provide a management burden of a new node in the enterprise because each SOA middleware appliance is configured individually and independent of the rest of the middleware infrastructure.

Many web applications implement a generic logout strategy that involves setting a logout timer, issuing an "idle session" warning within a given time period (e.g., 30 seconds) prior to the timeout and, then, after the time period expires, deleting the user's session. Thus, if a user is away from the computer or otherwise inattentive after the warning is issued, the user's session is terminated, after which the application redirects the browser either to a home page or a new login screen. This type of solution works well in some environments, such as a machine being used for web access in a public environment (e.g., a library or a cyber-café). Within a closed environment, however, this type of forced logoff function can be quite frustrating. The problem is exacerbated in a situation where the user has logged in from a trusted zone to administer an appliance, such as an appliance as described above. An appliance of this type typically utilizes numerous objects that must be configured following logoff. In such case, a forced logout (due to inactivity or inattention) deletes all previously-configured data, which requires prompting the user to re-enter that data again. This is a time-consuming and manual process that is highly undesirable, especially when used in the context of an appliance that has a large number of self-sufficient objects that are capable of being administered independently.

BRIEF SUMMARY OF THE INVENTION

According to this disclosure, a secure, layered logout of a user session is implemented in a web-based management tool, such as a middleware appliance. Thus, according to one embodiment, a logout strategy is provided to include a set of security levels of varying sensitivity, with each security level having a set of permissions associated therewith and that are enforced upon a timeout. Preferably, each succeeding security level in the set of security levels is reached as time increases from an idle time associated with the user session. Upon expiration of a timeout associated with a security level, the set of permissions associated with the security level are then enforced against at least one managed object while the user session continues. As each next security level is reached, the set of permissions associated with the security level are then enforced (with respect to the managed object or against one or more other managed objects), once again while the user session continues. Each of the objects preferably is managed independently of at least one other object; thus, the layered logout may enforce different permissions with respect to different managed objects while at the time maintaining the user session. If the user takes no action, eventually a timeout associated with a final security level of the set of security levels will occur, at which point the user session is finally terminated.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates a representative layered logout strategy having a number of security levels according to the techniques described herein;

FIG. 4 is a simplified block diagram illustrating how the layered logout strategy of FIG. 3 is implemented in a machine that has been provisioned with the logout functionality of this disclosure;

DETAILED DESCRIPTION OF AN ILLUSTRATIVE EMBODIMENT

Figure 1:
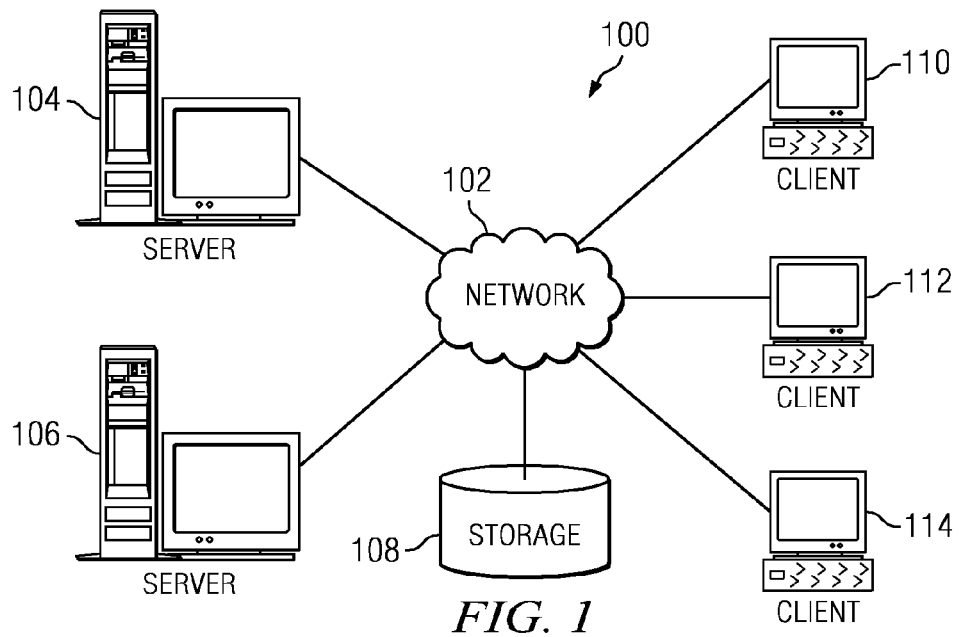
FIG. 1 depicts an exemplary block diagram of a distributed data processing environment in which exemplary aspects of the illustrative embodiments may be implemented.
Figure 2:
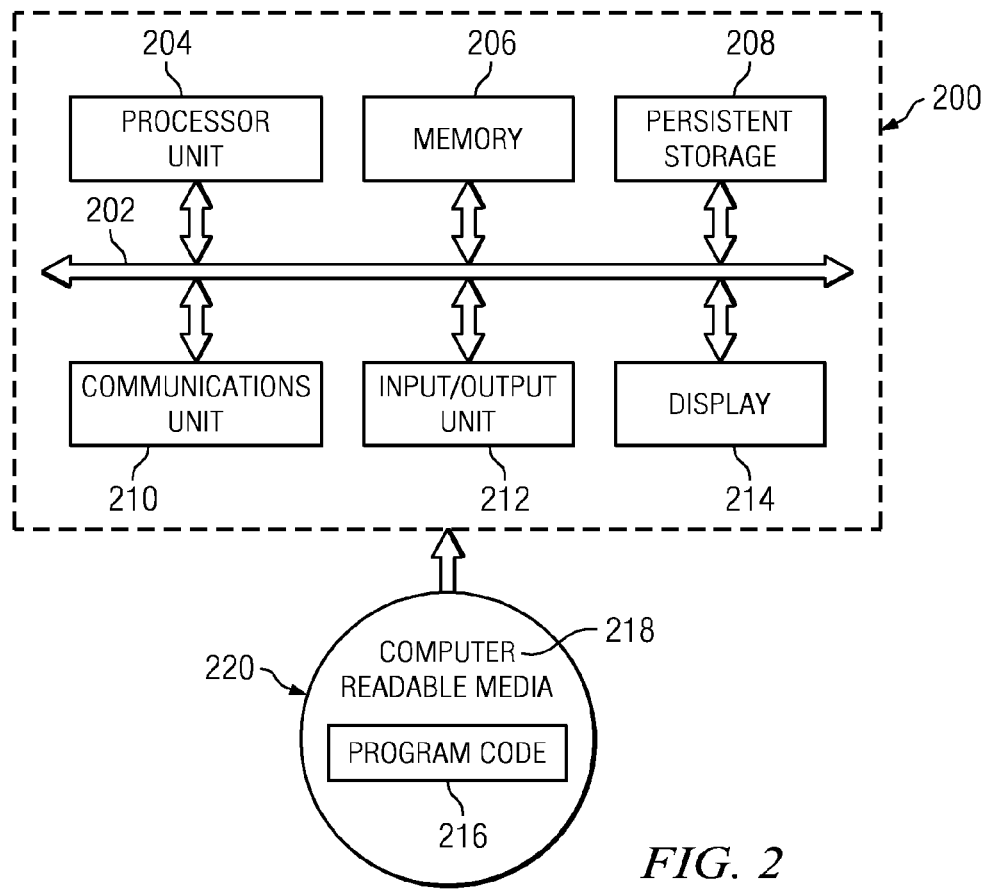
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Although not meant to be limiting, a representative data processing system in which the techniques of this disclosure are implemented is a Service Oriented Architecture (SOA) appliance. SOA middleware appliances accelerate XML and Web services deployments while extending an existing SOA infrastructure across an enterprise. The utilization of middleware-purposed hardware and lightweight middleware stacks provides a secure, consumable packaging for implementing middleware SOA functions. Representative appliances include, without limitation, the DataPower® accelerator devices available from IBM of Armonk, N.Y., USA. A representative appliance of this type provides common XML message transformation, XML processing, integration, MQ/HTTP/FTP connectivity, transport mediation, and routing and security functions. In a typical enterprise system, a user, such as a network manager, perceives a deployed appliance of this type as a management island, where each appliance must be configured individually and independent of the rest of the middleware infrastructure. Typically, the appliance is configured using a native web-based graphic user interface (WebGUI), such as a web browser. In the alternative, a command line or programmatic interface may be used. In a typical use case, the user also is responsible for appliance maintenance, such as to manually retrieve, back-up, and archive configuration. Moreover, when more than one appliance is to be used, e.g., to address scaling and redundancy built into the corresponding enterprise, the user must manually replicate configuration information across redundant appliances.

As described above, known techniques for web-based application logout typically set a logout timer, warn the user of an impending logout, and then delete the user's session on the appliance. Such "all or nothing" forced logoff techniques are undesirable in the context of an appliance such as described above. This is because such devices include a set of self-sufficient, independent objects each of which may have the capability of being viewed and/or configured on its own.

A forced logoff from the appliance-based web management tool is highly undesirable in this context.

The techniques that are now described address this problem by providing a secure, layered logout from a data processing system. In a representative embodiment, the technique is implemented in the context of an appliance-based web management tool, such as the DataPower® product, which is available commercially from IBM. Of course, the identification of this commercial product is not meant to be taken to limit the present invention. More broadly, any system, device, program or process that provides management of a data processing system may implement the teachings of this disclosure.

According to this disclosure, each of a set of management objects associated with a data processing system are categorized into one or more security levels, with each security level having an associated view status and an associated timer. Each status is independently configurable, and each associated timer is independently configurable. Each security level preferably represents security sensitivity, and an object is categorized into a security level based on the sensitivity of what the object represents. Thus, by way of example, a "logger" object might have a low security level (e.g., security level 1), where a user policy editor might have a high security level (e.g., security level 3). Once the objects are categorized into the security levels, the technique herein controls what objects are available to the user (and/or what actions can be taken with respect thereto) as an amount of idle time increases. By layering the security levels and controlling what objects are available to the user or what can be done with those objects, a much more nuanced logout strategy is implemented as compared to the prior art.

FIG. 3 illustrates Table I, which is a data structure illustrating a representative layered logout strategy that may be implemented according to this disclosure. This data structure is stored in memory or other data storage and is created or provided in any convenient manner, e.g., via an interface, a static configuration file, or programmatically. The table 300 comprises a category 302, a status 304, and a timer 306. The number of rows (categories) in this example identifies three (3) distinct security levels (e.g., security level 1, security level 2, security level 3, and so forth), but this is not a limitation. A method of secure, layered logout begins by providing a "layered" set of security levels in this manner. Preferably, the security level 1 represents the highest (or most sensitive) matter, with the sensitivity decreasing as the levels change. Of course, security level 1 may represent the least sensitive level, with sensitivity increases as the levels change. As noted, each security level 302 has associated therewith a "status," together with an associated "timer." Typically, the status 304 is a view status. Thus, in this example shown in FIG. 4, security level 1 has associated therewith a view status of "hide" at a time period defined by "timer 1." Likewise, security level 2 has associated therewith a view status of "show/read only" at a time period defined by timer 2. Security level 3 has associated therewith a view of status of "show/edit" at a time period defined by timer 3, and so on. As idle time runs, the timers preferably run concurrently so that timer 2 begins upon the expiration of timer 1, timer 3 begins upon the expiration of timer 2, and so on. A "final" security level is the one reached at a time most distant from the idle time during the user session.

The "status" in each security level may vary. The status typically defines a restriction placed upon some ability of the user to interact with an object being managed (a "managed object") during the user's session once associated timer expires. More generally, the "status" defines a set of access controls (or permissions) that are available (or that remain available) following the expiration of the associated security level timer (i.e. upon a timeout). A full set of access controls may include "edit," "read," "write," "save," and others depending on the object being managed. Once a timer associated with a security level expires, according to the techniques herein that set of access controls may then be modified, such as by being pruned to a more narrow set of permissions. As additional security level timers expire, the set of access controls is varied yet again, until eventually the user session is destroyed in its entirety.

As noted above, the time period defined by each security level timer may vary. Thus, the values in Table I are merely representative, and they should be taken to limit the invention, as any number of security levels, various types of status, and various timer configurations, all may be used.

Once each security level and its status and timer is defined, each management object in the system that is administered according to the described technique is associated with a security level based on the security "sensitivity" of that object. A management object is an access-controlled system resource. Generalizing, a given object may be a system, a sub-system, a service, a program or process. In the context of a web-based management tool such as described above, a management object may be quite varied and includes, without limitation, a web service, a protocol handler, a service configurator, a messaging service, an XML processor, a user policy editor, a logger, and the like. According to a more specific example of the described technique, a first set of one or more objects are associated with security level 1, a second set of one or more objects are associated with security level 2, a third set of one or more objects are associated with security level 3, and so forth. As a timer associated with a security level expires, the status "restriction" associated with the security level is then applied to the one or more objects defined for the security level. Thus, if security level 1 has a view status of "hide," following expiration of timer 1 the one or more objects associated with that security level are hidden from the user's view. If security level 2 has a view status of "show/read only," following expiration of timer 2 the one or more objects associated with that security level can be seen but are read-only, and so on. In this manner, a layered logout strategy is then enforced against the management objects.

A particular object may have multiple security levels associated therewith, in which case as each security level timeout is reached, one or more access controls is or are varied. Thus, for example, a particular object may have associated therewith three (3) security levels and a "full" set of access control permissions, such as edit, read, write, and save. As each progressive security level timeout occurs, the set of access control permissions is "pruned" to a subset of the full set. Thus, for example, after a first security level timeout, the access control permissions may only be "read and save," while after a next security level timeout the access control permissions are only "save." When all security level timeouts have occurred, the user finally is logged out completely (from all objects).

Thus, according to the techniques herein, a logout strategy is defined or otherwise provided to include a set of security levels of varying sensitivity, with each security level having a set of permissions associated therewith and that are enforced upon a timeout. Preferably, each succeeding security level in the set of security levels is reached as time increases from an idle time associated with the user session. Upon expiration of a timeout associated with a security level, the set of permissions associated with the security level are then enforced against at least one managed object while the user session continues. As each next security level is reached, the set of permissions associated with the security level are then enforced (perhaps against one or more other managed objects), once again while the user session continues. If the user takes no action, eventually a timeout associated with a final security level of the set of security levels will occur, at which point the user session is finally terminated.

FIG. 4 illustrates a simple use case for a web browser-based interface to a middleware appliance. In this embodiment, the appliance 400 is administered via a web browser 402 that communicates with the appliance over a secure HTTP link 404. In this example, there are three (3) distinct management objects: OBJ1 406, OBJ2 408 and OBJ3 410. Each management object is configurable via a local host connection (https://localhost/) in a known manner. The nature of the management object may be varied, as noted above. The appliance connects to the Internet via dataflow 412, and to an enterprise intranet via dataflow 414. Each management object is associated with a distinct security level, such as described above in the layered logout strategy shown in FIG. 3. In operation, after idle timer plus timer 1, the first security level expiration is reached. At this point, and assuming the end user (using the web browser) has taken no action, OBJ1 is removed from the screen (in other words, becomes hidden). This is the view status shown in FIG. 3 for this example, the most security sensitive object. After idle timer plus timer 2, the second security level expiration is reached and, as a consequence, OBJ2 is still shown but becomes "read only" according to the status configured in the layered strategy of FIG. 3. Finally, after idle timer plus timer 3, the third security level expiration is reached. At this point, the user session is destroyed and the user is logged out completely. To continue administration, the user is required to login again.

The above-described layered logout strategy is enforced on a per management object basis, or across a set of management objects, preferably with respect to a middleware appliance (or the like) that is administered by a user having administrative access thereto via a trusted zone. In this manner, the technique provides for a secure, layered logout strategy for an appliance-based web management tool that overcomes the many deficiencies of the "all of nothing" prior art approaches.

Figure 5:
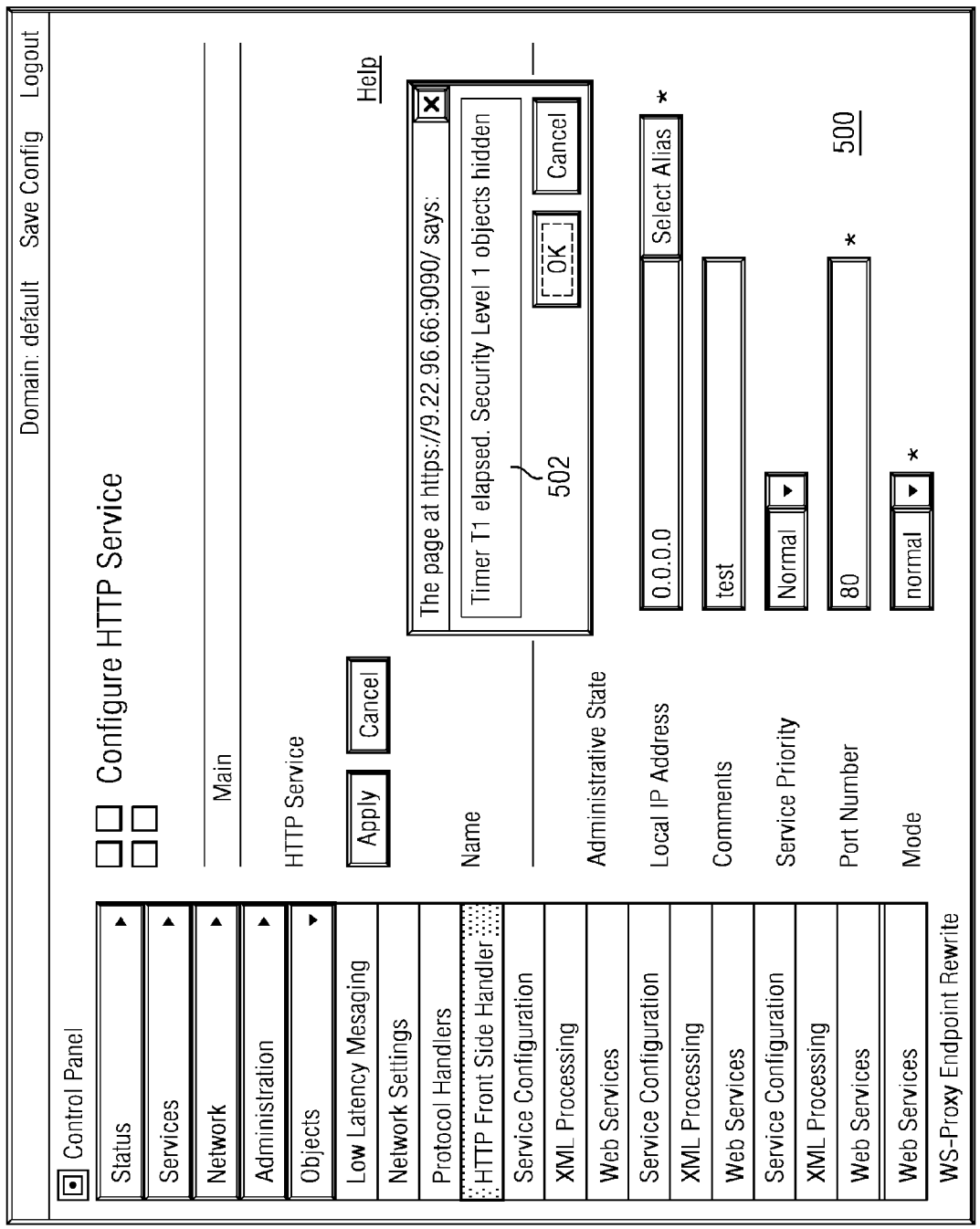
FIG. 5 is a screen shot of a portion of a user terminal interface illustrating a first security level prompt that is provided to a user after a first time period has elapsed.
Figure 6:
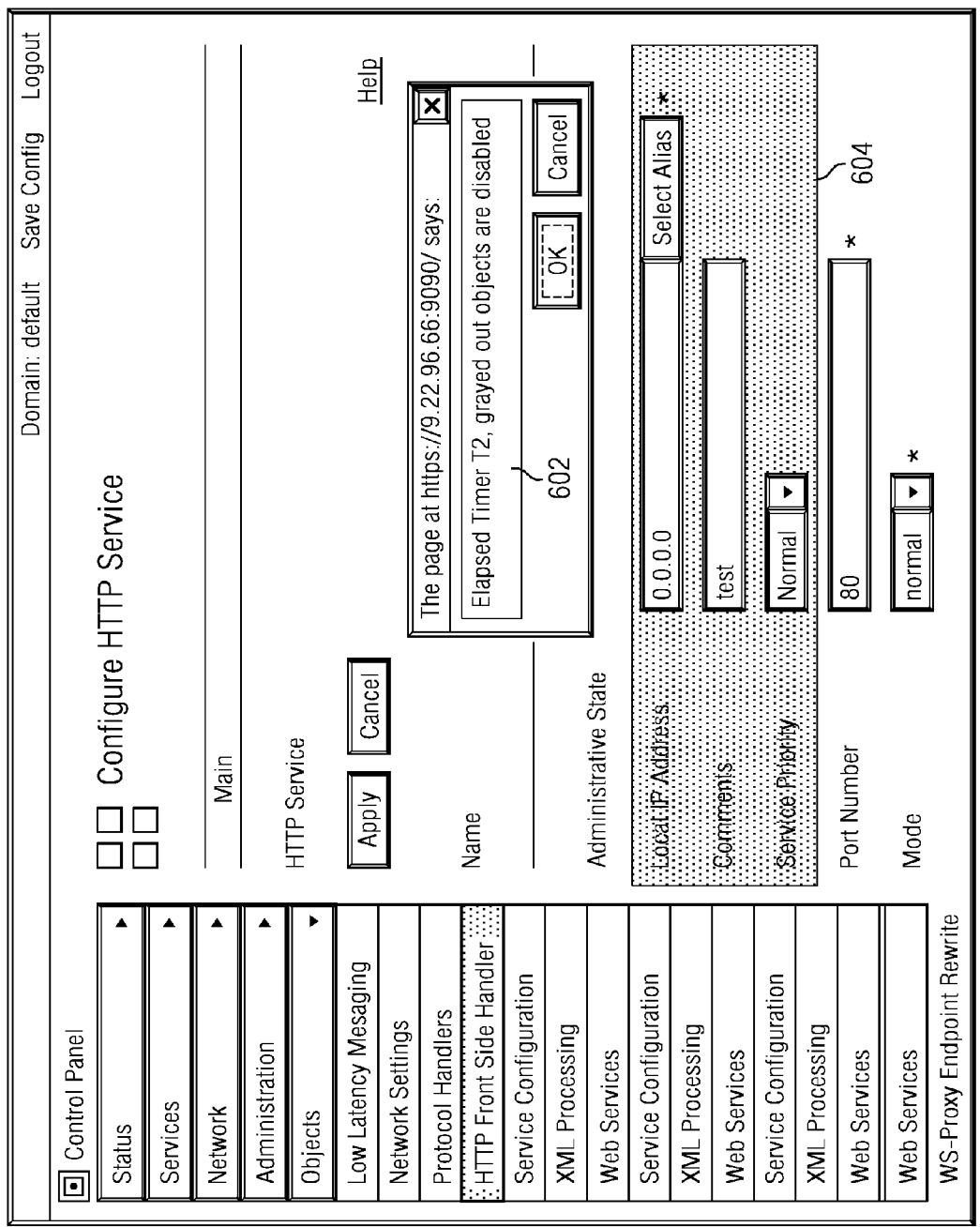
FIG. 6 is a screen shot of the portion of the user terminal interface of FIG. 5 illustrating a second security level prompt that is provided to the user after a second time period has elapsed.

FIG. 5 is a screen shot of a portion of a user terminal interface illustrating a first security level prompt that is provided to a user after a first time period has elapsed. In this example, the management object is an HTTP Service and, in particular, an HTTP Front Side Handler 500. In this example, HTTP Front Side Handler 500 is a management object with a "second" security level of sensitivity. As can be seen, the HTTP Front Side Handler has a set of administrative options that include Administrative State, Local IP Address, Service Priority, Port Number and Mode. A Comment field is also present in the interface. In this example, the HTTP Front Side Handler is not a security level 1 object; thus, when the timer 1 elapses, it is still available for configuration. Upon this expiration, however, the described functionality causes the display of a popup window 502 with a message informing the user that the timer 1 has elapsed and that associated security level 1 objects are hidden. The user can select the OK button and save the configuration at this point if he or she elects, or the user can select the cancel button to continue configuring this particular object. Because the security level 1 timer has elapsed, however, objects associated with that level are removed from the screen (and cannot be edited). FIG. 6 is a screen shot of the portion of the user terminal interface of FIG. 5 illustrating a new popup window 602 that is displayed after the second security level expires (after timer 2). Popup window 602 includes a message informing the user that the timer 2 has elapsed and that associated security level 2 objects are (in this example, consistent with FIG. 3) grayed out (show/read only), as indicated by reference numeral 604. Once again, the user may select the OK button in the popup window and save the configuration at this point if he or she elects, or the user can select the cancel button in the popup window to continue configuring the available portions of this object (e.g., the Port Number and Mode fields), or to administer some other management object that has not yet been affected by the timer expirations. The layered logout continues in this timed manner, until the user is finally logged out of the session completely.

The notifications provided to the user may be issued aurally as well as visually.

The layered logout strategy is controlled by a set of one or more timers configured in the manner described above, together with a control routine that operates to restrict each managed object according to the preset configuration. In particular, the control routine is triggered by a timeout (expiration of a timer) and interoperates with one or display routines to mask or otherwise gray out portions of the display so that the user is not then able to continue the configuration. While there may be many ways of accomplishing this control, a convenient technique may be to use an operating system graphics device interface (GDI). As is well-known, an operating system may use a graphics device interface to enable applications to use graphic and format text on a view display. Thus, for example, applications running on Windows-based platforms do not access graphics hardware directly; rather, the device interface typically interacts with device drivers on behalf of some calling application. Different GDI functions are used to render information on a video display. In operation, the calling application creates or acquires a device context and uses a set of rendering functions to render the desired content. According to the techniques described herein, this rendering process is modified to mask or gray out the relevant portions of the management object display interface. In addition, suitable code is provided to cause the display of the user popup displays, such as illustrated above. An alternative to graying out the interface may be to provide an alternative color scheme and/or other GUI indicators. A mouse over bubble may be used in lieu of a popup window. The above-described technique is merely representative, as any convenient code implementation may be used to control and manage the interface displays (including the popup messages) upon expiration of the one or more security level timers during the layered logout. As has been described, after a particular timer expires, however, the user session is maintained so that the user may still administer other objects or a subset of the object impacted by the timeout.

There may be a default policy for objects that a user decides not to configure. Thus, for example, the system may include a global setting that is associated with a timeout (e.g., 3 minutes) such that, after that time expires, an application logs out, disabling all objects. Further, the logout strategy may be administrator-defined, or hard-coded into the system itself.

The above-described examples and use cases assume that the user performs a login to the appliance being administered from a trusted zone in the enterprise. This is not a requirement, however.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. Also, the techniques herein may be practiced in a loosely-coupled server (including a "cloud"-based) environment. The layered logout functionality itself may be hosted in the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The strategy (security levels, status, timer values) can be configured into a data structure (e.g., an array, a linked list, etc.) and stored in a data store, such as computer memory. Furthermore, as noted above, the layered logout functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the layered logout components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The layered logout function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The techniques disclosed herein are not limited to a Web-based middleware appliance, but this will be a typical implementation. As noted, the above-described function may be used in any system, device, portal, site, or the like wherein one or more objects are managed (administered) through a browser (or other rendering program).

Having described our invention, what we now claim is as follows.

The invention claimed is:

1. A method to provide a structured logout from a user session, comprising:
   providing a logout strategy to include a set of security levels of varying sensitivity, each security level having a set of permissions associated therewith and that are enforced upon a timeout, and wherein each succeeding security level in the set of security levels is reached as time increases from an idle time associated with the user session;
   upon expiration of a timeout associated with a security level, enforcing the set of permissions associated with the security level against at least one managed object while continuing the user session; and upon expiration of a timeout associated with a final security level of the set of security levels, ending the user session.

2. The method as described in claim 1 wherein the set of permissions associated with the security level are a subset of a set of available permissions that are associated with the at least one managed object.

3. The method as described in claim 1 wherein the timeout associated with the security level has a first length that differs from a timeout associated with at least one other security level.

4. The method as described in claim 1 further including associating a first security level with a first managed object, and a second security level with a second managed object that differs from the first managed object.

5. The method as described in claim 4 wherein each of the first and second security levels have differing sets of permissions so that expiration of a timeout associated with the first security level enforces a first set of permissions against the first managed object and expiration of a timeout associated with the second security level enforces a second set of permissions against the second managed object.

6. The method as described in claim 1 further including issuing a notification upon expiration of a timeout associated with a security level.

7. The method as described in clam 1 further including logging in to the user session in a trusted manner.

8. The method as described in claim 1 wherein the managed object is an object that is managed during the user session independently of at least one other managed object.

9. Apparatus to provide a structured logout from a user session, comprising:
a processor;
computer memory holding computer program instructions that when executed by the processor perform a method comprising:
providing a logout strategy to include a set of security levels of varying sensitivity, each security level having a set of permissions associated therewith and that are enforced upon a timeout, and wherein each succeeding security level in the set of security levels is reached as time increases from an idle time associated with the user session;
upon expiration of a timeout associated with a security level, enforcing the set of permissions associated with the security level against at least one managed object while continuing the user session; and
upon expiration of a timeout associated with a final security level of the set of security levels, ending the user session.

10. The apparatus as described in claim 9 wherein the set of permissions associated with the security level are a subset of a set of available permissions that are associated with the at least one managed object.

11. The apparatus as described in claim 9 wherein the timeout associated with the security level has a first length that differs from a timeout associated with at least one other security level.

12. The apparatus as described in claim 9 further including associating a first security level with a first managed object, and a second security level with a second managed object that differs from the first managed object.

13. The apparatus as described in claim 12 wherein each of the first and second security levels have differing sets of permissions so that expiration of a timeout associated with the first security level enforces a first set of permissions against the first managed object and expiration of a timeout associated with the second security level enforces a second set of permissions against the second managed object.

14. The apparatus as described in claim 9 wherein the method further includes issuing a notification upon expiration of a timeout associated with a security level.

15. The apparatus as described in clam 9 wherein the method further includes logging in to the user session in a trusted manner.

16. The apparatus as described in claim 9 wherein the managed object is an object that is managed during the user session independently of at least one other managed object.

17. A computer program product in a non-transitory computer readable medium for use in a data processing system to provide a structured logout from a user session, the computer program product holding computer program instructions which, when executed by the data processing system, perform a method comprising:
providing a logout strategy to include a set of security levels of varying sensitivity, each security level having a set of permissions associated therewith and that are enforced upon a timeout, and wherein each succeeding security level in the set of security levels is reached as time increases from an idle time associated with the user session;
upon expiration of a timeout associated with a security level, enforcing the set of permissions associated with the security level against at least one managed object while continuing the user session; and
upon expiration of a timeout associated with a final security level of the set of security levels, ending the user session.

18. The computer program product as described in claim 17 wherein the set of permissions associated with the security level are a subset of a set of available permissions that are associated with the at least one managed object.

19. The computer program product as described in claim 17 wherein the timeout associated with the security level has a first length that differs from a timeout associated with at least one other security level.

20. The computer program product as described in claim 17 further including associating a first security level with a first managed object, and a second security level with a second managed object that differs from the first managed object.

21. The computer program product as described in claim 20 wherein each of the first and second security levels have differing sets of permissions so that expiration of a timeout associated with the first security level enforces a first set of permissions against the first managed object and expiration of a timeout associated with the second security level enforces a second set of permissions against the second managed object.

22. The computer program product as described in claim 17 wherein the method further includes issuing a notification upon expiration of a timeout associated with a security level.

23. The computer program product as described in claim 17 wherein the method further includes logging in to the user session in a trusted manner.

24. The computer program product as described in claim 17 wherein the managed object is an object that is managed during the user session independently of at least one other managed object.

25. The computer program product as described in claim 17, wherein the computer program instructions are stored in the computer readable medium in the data processing system, wherein the computer program instructions were downloaded over a network from a remote data processing system.

26. The computer program product as described in claim 17, wherein the computer program instructions are stored in the computer readable medium in the data processing system, wherein the computer program instructions are downloaded over a network to a remote data processing system for use in a computer readable medium with the remote system.

* * * * *